United States Patent Office.

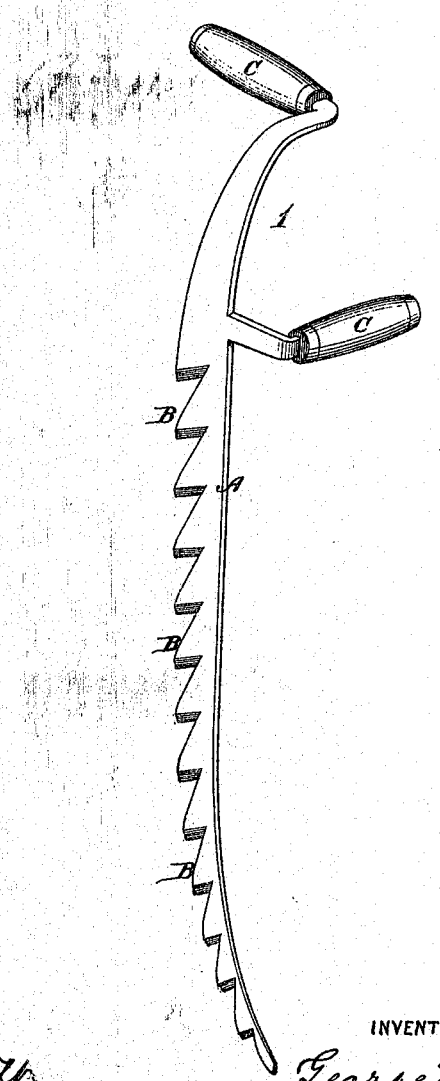

GEORGE F. WEYMOUTH, OF DRESDEN, MAINE.

Letters Patent No. 112,400, dated March 7, 1871.

IMPROVEMENT IN HAY-KNIVES.

The Schedule referred to in these Letters Patent and making part of the same.

*To all whom it may concern:*

Be it known that I, GEORGE F. WEYMOUTH, of Dresden, in the county of Lincoln and State of Maine, have invented a new and useful Knife for Cutting Hay in the Mow when a division of the mow is desirable, or cutting the mow into square blocks or bundles to be pressed; and I do hereby declare that the following is a full and exact description thereof, reference being had to the accompanying drawing and to the letters of reference thereon.

My invention consists of a long flat piece of steel in the shape of a sword, excepting the handle, with little knives on one edge from the handles A A to the point, the two handles standing out on one side, with which I thrust the knife B perpendicularly into the hay, working it up and down as I would a saw, until I cut the length of the bale to be pressed; then I turn and cut the width, so round to the place of beginning.

The bundle C, now being cut out, is hoisted from its bed whole by tackle, and placed in the press, doing away with hand pitching.

To enable others skilled in the art to make and use my invention, I will proceed to describe its construction and operation.

I make my knife about one inch in width and one-fourth inch in thickness at the handles, and quite thin at the point, crooked edgewise, like a broadsword, with tooth-like knives about an inch long, D D D, on the outer edge or curve, their points inclining toward the point of the knife, as may be seen in the drawing making a part of this specification, in which.

Figure 1 represents the whole knife, which I call the "saw-knife." It may be any length required.

The purpose of the inclination of the knife-teeth or little knives is that they may feed themselves.

What I claim as my invention, and desire to secure by Letters Patent, is—

The improved hay-knife above described, consisting of the curved blade A, having knife-edged serrations B and handles C C placed as shown, all substantially as specified.

GEO. F. WEYMOUTH.

Witnesses:
   A. J. SMALL,
   M. A. CALL.